United States Patent
Sueishi

(10) Patent No.: US 8,042,583 B2
(45) Date of Patent: Oct. 25, 2011

(54) PNEUMATIC TIRE FOR OFF-ROAD TRAVELING WITH TREAD INCLUDING BLOCKS HAVING RECESS PORTIONS

(75) Inventor: Makoto Sueishi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1008 days.

(21) Appl. No.: 11/984,169

(22) Filed: Nov. 14, 2007

(65) Prior Publication Data

US 2008/0110541 A1     May 15, 2008

(30) Foreign Application Priority Data

Nov. 15, 2006   (JP) ................ 2006-309473

(51) Int. Cl.
*B60C 11/11*     (2006.01)
(52) U.S. Cl. ......... 152/209.15; 152/209.11; 152/209.21; 152/902
(58) Field of Classification Search ............. 152/209.11, 152/209.15, 209.18, 209.21, 902
See application file for complete search history.

(56) References Cited

U.S. PATENT DOCUMENTS 5,178,699 A * 1/1993 Kakumu et al. ............... 152/902
5,355,922 A * 10/1994 Kogure et al. ........... 152/209.18

FOREIGN PATENT DOCUMENTS

| JP | 02-099409 | * | 4/1990 |
| JP | 06-320916 | * | 11/1994 |
| JP | 11-078427 A | | 3/1999 |
| JP | 2002-362111 | * | 12/2002 |
| JP | 2006-027567 | * | 2/2006 |

OTHER PUBLICATIONS

Machine translation for Japan 2006-027567 (no date).*
Machine translation for Japan 06-320916 (no date).*
Machine translation for Japan 2002-362111 (no date).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire having an improved off-road traveling performance, which has a block pattern that a plurality of blocks 7 are provided in a tread portion, in which each of the blocks 7 includes a tread surface 9 facing radially outward and a wall surface 10 extending radially inwardly from the edge "e" of the tread surface 9, and at least one of the blocks 7 is provided with at least one recess portion 11 which extends on the wall surface 10 in the radial direction, and whose radially outer end opens at the tread surface 9 and whose length L along the wall surface 10 is from 10 to 70% of the height BL of the blocks 7.

4 Claims, 5 Drawing Sheets

PNEUMATIC TIRE FOR OFF-ROAD TRAVELING WITH TREAD INCLUDING BLOCKS HAVING RECESS PORTIONS

BACKGROUND OF THE INVENTION

The present invention relates to a pneumatic tire having an improved off-road traveling performance, and more particularly to an off-road tire capable of cornering at a high speed to shorten a lap time in races such as motocross.

For vehicles traveling on unpaved roads or rough terrain such as motocross motorcycles and rally cars are usually employed pneumatic tires having a block type tread pattern in which a plurality of blocks are provided in a tread portion, as disclosed for example in JP-A-11-078427. These tires having a block pattern can secure a driving force on a soft ground such as mud or sand by blocks biting into the ground.

In recent years, increase in cornering speed on rough terrain is strongly desired in order to shorten the lap time in auto or motorcycle races. In general, for increasing the cornering speed, it is required to reduce a skid between a tire and a ground surface during steering, in other words, to increase a friction force between them.

It is an object of the present invention to provide an off-road pneumatic tire capable of increasing the cornering speed.

This and other objects of the present invention will become apparent from the description hereinafter.

SUMMARY OF THE INVENTION

It has been found that it is effective for increasing the friction force on rough terrain to cause blocks to bite deeply into the ground and, for this purpose, it is effective to form a large number of three-dimensional corner portions in the blocks. Specifically, it has been found that when at least one recess portion having a specific radial length is formed in a wall of at least one block so as to open at the tread surface of the block, three-dimensional corner portions are formed on the both sides of the recess portion at the trade surface, whereby the block can bite deeply into a rough ground to reduce a skid on rough ground, thus increasing the cornering speed thereon.

In accordance with the present invention, there is provided a pneumatic tire for off-road traveling having a block pattern that a plurality of blocks are provided in a tread portion, in which:

each of the blocks includes a tread surface facing radially outward and a wall surface extending radially inwardly from the edge of the tread surface, and at least one of the blocks is provided with at least one recess portion which extends on the wall surface in the radial direction, and whose radially outer end opens at the tread surface and whose length along the wall surface is from 10 to 70% of the height of the block.

It is preferable that in a cross section perpendicular to an imaginary line connecting the both ends of a radially outer edge, which appears at the tread surface, of the recess portion, the recess portion is recessed toward the block center side than an imaginary line connecting the radially outer edge and a radially inner end of the recess portion.

Further, it is preferable that the wall surface of a block has an intersecting portion of two planes and at least one recess portion is formed to extend over the two planes. The interior angle of the intersecting portion between the two planes is preferably more than 90°. It is also preferable that the wall surface of a block has one or more intersecting portions at which two planes intersects each other, and at least one recess portion is formed in at least one intersecting portion located on a tire equator side with respect to the centroid of the tread surface of the block.

In a preferable embodiment, the blocks comprise crown blocks that the centroids of their tread surfaces are located in a crown region which extends axially outwardly from the tire equator and has an axial width of 40% of the tread width, and shoulder blocks that the centroids of their tread surfaces are located in shoulder regions extending axially outward of the crown region, and the recess portions are provided in only the shoulder blocks.

The off-road tire according to the present invention is provided in at least one block with at least one recess portion which opens at the tread surface of the block and extends along the wall of the block in the radial direction. Therefore, three-dimensional corner portions in which the both ends of a radially outer edge, which appears at the tread surface, of the recess portion are vertexes of the corner portions, are formed on the both sides of the recess portion at the trade surface of the block. Since such corner portions are easy to bite into the ground, a frictional force between the block and the ground is enhanced. Further, since the recess portion opens at the tread surface of a block, the ground contact area of the tread surface is reduced and, therefore, the ground contact pressure of the tread surface is increased to further increase the amount of biting into the ground. Further, since the radial length of the recess portion is regulated within a specific range defined under connection with the radial height of the block, the above effects are obtained over a long period, and excessive deterioration in rigidity of the block can be effectively prevented. As a result of these effects, the pneumatic tire of the present invention can suppress a skid during cornering on rough terrain and can increase the cornering speed on rough terrain.

DETAILED DESCRIPTION OF THE INVENTION

An embodiment of the present invention will now be explained with reference to the accompanying drawings.

Figure 1:
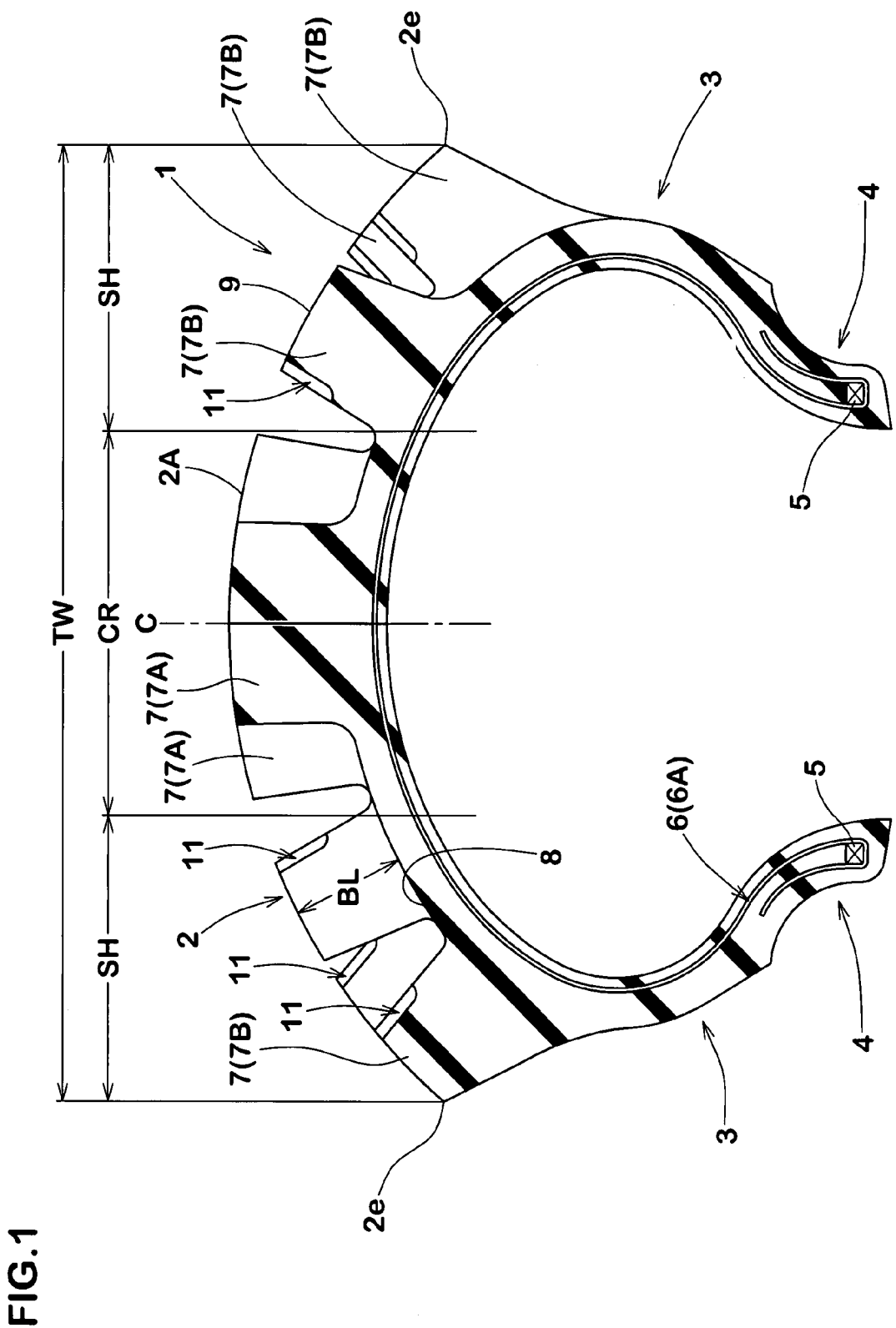
FIG. 1 is a cross sectional view of a pneumatic tire illustrating an embodiment of the present invention.
Figure 2:
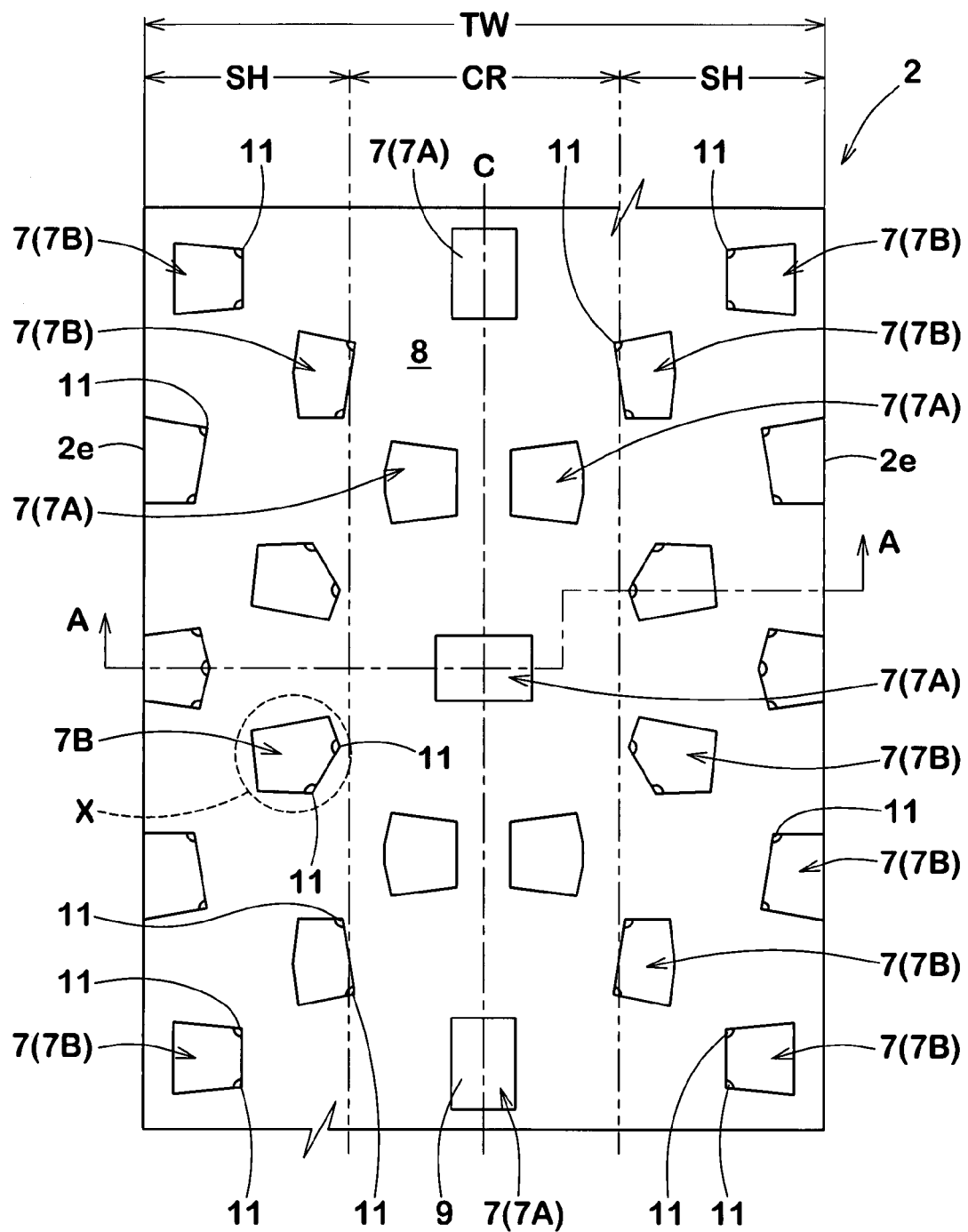
FIG. 2 is a development of a tread portion of the tire of FIG. 1.

FIG. 1 is a cross sectional view of a pneumatic tire 1 for off-road traveling illustrating an embodiment of the present invention, and FIG. 2 is a development of a tread portion 2 of the tire 1 shown in FIG. 1. FIG. 1 corresponds to a sectional view taken on line A-A in FIG. 2.

The term "pneumatic tire for off-road traveling" as used herein means a tire designed so as to be able to exhibit maximum performances on unpaved roads or rough terrain as in rally, motocross and the like.

The pneumatic tire 1 in this embodiment includes a tread portion 2, a pair of sidewall portions 3,3 extending radially inwardly from the both edges of the tread portion 2, and a pair of bead portions 4,4 which are continuous with radially inner edges of the sidewall portions 3,3.

The pneumatic tire 1 of the embodiment shown in FIG. 1 is a motorcycle tire in which a tread width TW which is an axial distance between the both tread edges 2e,2e provides the maximum width of the tire 1, and the tread portion 2 is curved in an arc-like shape having a relatively small radius of curvature to have a radially outwardly convex profile in the transverse cross section. Of course, the pneumatic tires according to the present invention may be those for four-wheeled vehicles and three-wheeled vehicles such as tricycle buggy.

In principle, the term "tread width TW" as used herein denotes an axial distance between both axial edges of a ground contacting portion of tread 2 of a tire that is brought into contact with a flat surface at a camber angle of 0° under the condition that the tire is mounted on a normal rim and inflated to a normal inner pressure, and to such a tire in the unloaded normal state is applied a normal load. However, in case of tires for motorcycle as illustrated in this embodiment with reference to the accompanying drawings, the tread portion 2 has an arc-like profile in the cross section and tread edges 2e,2e which are the axial outermost edges of the tread portion 2 are distinct. Therefore, in case of motorcycle tires, the axial distance between the tread edges 2e,2e in the normal state (unloaded) is exceptionally defined as the tread width TW.

The term "normal rim" denotes a rim defined for every tire in a standardizing system on which the tire is based and is, for example, the "standard rim" in JATMA, the "Design Rim" in TRA and the "Measuring Rim" in ETRTO. The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO, provided that in case of tires for passenger cars, the "normal inner pressure" is 180 kPa. The term "normal load" denotes a load defined for every tire in the standardizing system and is, for example, the "maximum load capacity" in JATMA, the maximum value recited in the table of "Tire Load Limits at Various Cold Inflation Pressures" in TRA, and the "Load Capacity" in ETRTO, provided that in case of tires for passenger cars, the "normal load" denotes a load corresponding to 88% of the load defined above. With respect to the above definitions, in the case that there is no standard, a value recommended by a manufacturer or a distributor is applied.

In the specification, the "dimensions" of respective parts or portions of the tire denote those measured in the normal state, unless otherwise noted. As stated above, the term "normal state" denotes a normally-inflated unloaded state of a tire in which the tire is mounted on a normal rim and inflated to a normal inner pressure, but is not loaded.

The pneumatic tire 1 is reinforced by a carcass 6 comprising at least one carcass ply 6A which extends between bead cores 5,5 in opposing bead portions 4,4. As a carcass cord of the carcass ply 6A is suitably used, for example, an organic fiber cord. In accordance with the carcass structure such as radial structure or bias structure and the purposes of tires, a breaker, a belt layer and other known elements may be suitably disposed radially inward of the tread portion 2.

The tread portion 2 is provided with a plurality of blocks 7 protuberant radially outwardly from a tread bottom. Between the blocks 7 are formed a relatively large tread bottom 8 which corresponds to a groove bottom. As apparent from FIG. 2, the blocks 7 are provided sparsely. Such a sparsely distributed disposition of blocks 7 is useful for securing a high driving force since the ground contact pressure of respective blocks 7 is increased to increase the amount of sticking into a soft terrain such as mud of blocks 7. Further, since a wide tread bottom 8 is formed between the blocks 7,7, mud dischargeability is high and clogging of grooves can be prevented.

The sparsely distributed disposition of blocks 7 can be quantitatively defined by a land ratio Sb/S of the total surface area Sb of tread surfaces 9 facing radially outwardly of blocks 7 to the whole surface area S of the tread portion 2 (i.e., surface area of an imaginary tread in which whole tread bottom 8 is filled up). The land ratio Sb/S is preferably at least 10%, more preferably at least 17%, further preferably at least 18%, and is preferably at most 30%, more preferably at most 28%, further preferably at most 26%.

Preferably, the blocks 7 comprise crown blocks 7A which have the centroids of their tread surfaces 9 in a crown region CR which extends axially outwardly from the tire equator C and has an axial width of 40% of the tread width TW, and shoulder blocks 7B which have the centroids of their tread surfaces 9 in shoulder regions SH located axially outward of the crown region CR. The shoulder blocks 7B can contact the ground not only when traveling straight but also when cornering, and a sufficient driving force can be secured when cornering. The disposition or distribution of blocks 7 is not limited to that shown in the drawings, and known tread patterns for off-road tires can be applied in the present invention.

Figure 3:
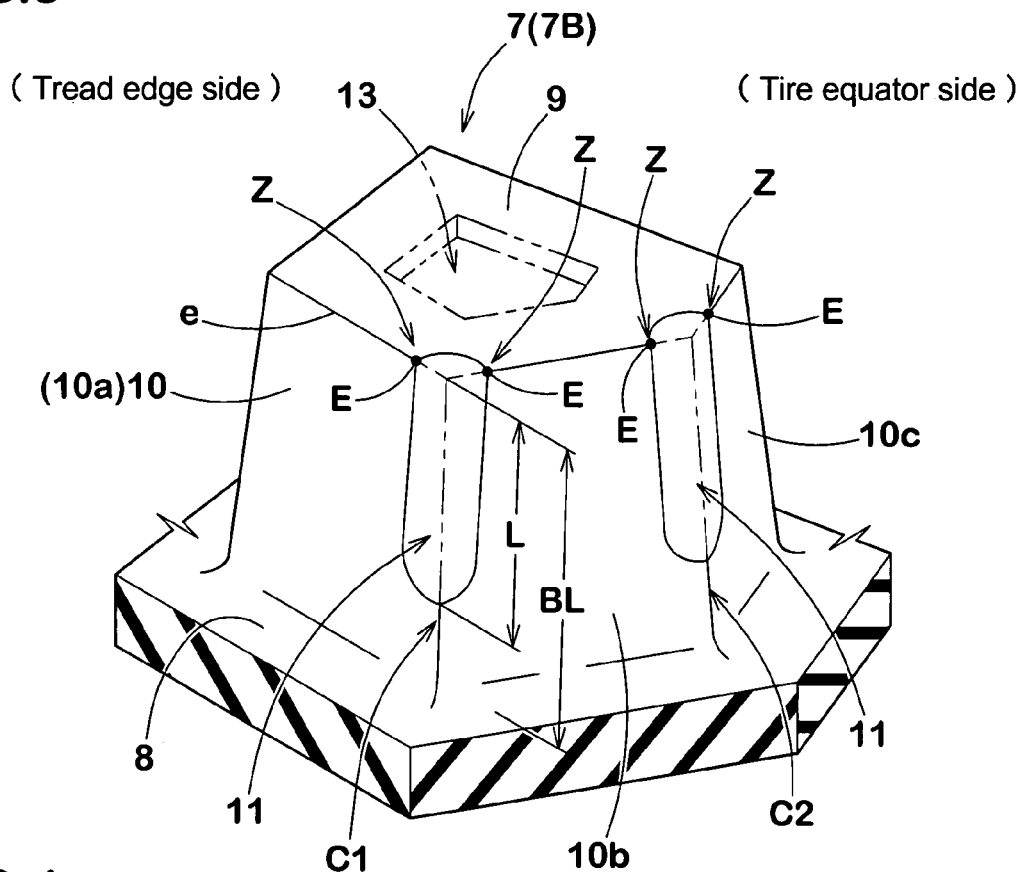
FIG. 3 is a perspective view of a shoulder block.
Figure 4:
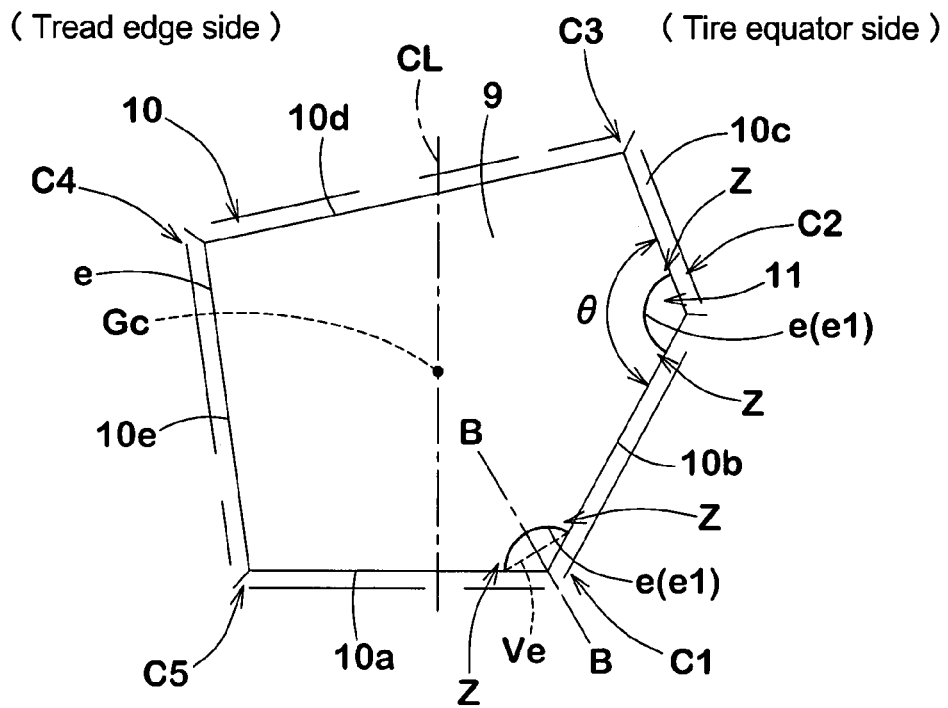
FIG. 4 is a plan view of the shoulder block showing the tread surface thereof.

In FIG. 3 is shown a perspective view of a block 7 (shoulder block 7B) enclosed by a circle X in FIG. 2. A plan view of this block 7 is also shown in FIG. 4. This block 7 includes the tread surface 9 facing radially outwardly, and a wall surface 10 which extends radially inwardly from the edge "e" of the tread surface 9 and is continuous with the tread bottom 8. On a hard terrain such as an asphalt road, only the tread surface 9 comes into contact with the road, but on a soft terrain such as mud or sand, the block 7 bites into the ground, so both the tread surface 9 and the wall surface 10 can contact the ground.

The tread surface 9 of a block may be flat, or it may be provided with a dent 13 as shown by an imaginary line in FIG. 3 in order to enhance the frictional force with the ground.

The wall surface 10 of a block 7 may be a curved surface, or may include a plurality of plane portions, e.g., plane portions 10a to 10e. In the latter case, the wall surface 10 includes at least one plane-intersecting portion formed by intersection of adjacent plane portions (e.g., plane portions 10a and 10b). In this embodiment shown in the drawings, since the block 7 is formed into a pentagonal prism shape in which five plane portions 10a to 10e are connected to each other, the block 7 has five plane-intersecting portions C1 to C5. The shape of block 7 is not particularly limited and may be, for example, a quadratic prism shape or a columnar shape having both at least one curved wall portion and at least two adjacent plane wall portions.

In the present invention, one or a plurality of recess portions 11 (in case of the embodiment shown in the drawings, two recess portions 11) are provided in at least one block 7. The recess portion 11 is formed, for example, in the form of a slot which extends along the wall surface 10 in the radial direction and opens at the tread surface 9.

Such a recess portion 11 provides three-dimensional corner portions Z, the vertexes of which are both ends E,E of a radially outer edge e1, which appears at the tread surface 9, of the recess portion 11. Since such corner portions Z are easy to bite into the ground, a frictional force between the block 7 and the ground is enhanced as compared with a block having no recess portion. Further, since the recess portion 11 opens at the tread surface 9 of a block 7, the ground contact area of the tread surface 9 is reduced and, therefore, the ground contact pressure of the tread surface 9 is increased to further increase the amount of biting into the ground of the block 7. Thus, the pneumatic tire 1 of the present invention can suppress a skid during cornering on rough terrain and can increase the cornering speed on rough terrain.

If the length L of the recess portion 11 measured along the wall surface 10 of a block 7 is too small, the recess portion 11 disappears in an early stage of use owing to abrasion of the block 7 and the above effects are not sufficiently expected. Therefore, it is required that the length L of the recess portion 11 is at least 10% of a height BL of the block 7 from the tread bottom 8 to the tread surface 9. The length L is preferably at least 20%, more preferably at least 40%, of the height BL of the block 7. On the other hand, if the length L of the recess portion 11 is too large, the rigidity which is a basic property for the block 7 is lowered, so the block tends to become easy to fall at the time of cornering, thus impeding improvement of cornering speed. Therefore, it is required that the length L of the recess portion 11 is at most 70% of a height BL of the block 7. The length L is preferably at most 65%, more preferably at most 60%, of the height BL of the block 7.

The height (maximum height) BL of block 7 is not particularly limited. However, if the height BL is too small, there is a tendency that sufficient driving or braking force is not obtained on unpaved road or rough terrain, and if the height BL is too large, very large bending moment acts on the root of the block 7 at the time of driving or braking, so the durability of the block 7 tends to deteriorate. From such points of view, it is preferable that the height BL of the block 7 between the tread surface 9 of block 7 and the tread bottom 8 is at least 10.0 mm, especially at least 11.0 mm, and is at most 19.0 mm, especially at most 18.0 mm.

In this embodiment shown in the drawings, the recess portions 11 are provided to chamfer the plane-intersecting portions C1 and C2. In other words, a recess portion 11 is formed to extend over adjacent two planes, e.g., plane portions 10a and 10b which intersect to form the plane-intersecting portion C1. The other recess portion 11 is formed to extend over two plane portions 10b and 10c which intersect to form the plane-intersecting portion C2. The block 7 having the plane-intersecting portions C1 to C5 is easy to bite into the ground based on its shape. By providing the corner portions Z as mentioned above on the both sides of at least one plane-intersecting portion, the block 7 can bite further deeply into the ground.

The interior angle θ of the plane-intersecting portions C1 and C2 at which recess portions 11 are formed is preferably more than 90°. As shown in FIG. 4, the interior angle θ denotes an angle inside a block formed between adjacent two plane portions and is measured on a cross section parallel to the tread surface 9 of the block. A wall surface-intersecting portion having such an interior angle θ has a relatively high rigidity and, therefore, the rigidity does not detrimentally lower even if a recess portion 11 is formed there. Therefore, excessive deformation of a block 7 is prevented even during cornering, and it is possible to make the block 7 bite more effectively into the ground.

In case of motorcycles, the cornering is performed by banking the vehicle. Therefore, contribution of shoulder blocks 7B is large during cornering. On the other hand, crown blocks 7A have a higher ground contact pressure than the shoulder blocks 7B and sensitively respond to unevenness of the ground. Therefore, if recess portions 11 are provided in crown blocks 7B, the recess portions 11 excessively respond to unevenness of the ground so that the vehicle travels in a zigzag line. Thus, the stability in straight traveling tends to be deteriorated. From such points of view, it is preferable that the recess portions 11 are provided in only the shoulder blocks 7B without providing in the crown blocks 7A. With this, a skid during cornering can be effectively suppressed to realize a high cornering speed without impairing the stability in straight traveling.

In case of a pneumatic tire 1 having a radially outwardly convex tread profile as shown in FIG. 1, each shoulder block 7B comes into contact with the ground mainly at its tire equator side. Therefore, from the viewpoint of making the shoulder blocks 7B bite more deeply into the ground, it is preferable to form one or more recess portions 11 in one or more of plane-intersecting portions located on a tire equator C side of a shoulder block 7B. The expression "plane-intersecting portion on a tire equator side" or the like expression denotes a plane-intersecting portion located on a tire equator side with respect to a circumferential line CL which passes through the centroid Gc of the tread surface 9 of a block 7. In FIG. 4, intersecting portions C1, C2 and C3 correspond to the plane-intersecting portions on a tire equator side. From the viewpoint of preventing marked lowering of the rigidity of a shoulder block 7B, it is not always required that all of the plane-intersecting portions C1 to C3 located on the tire equator C side are provided with a recess portion 11.

Figure 5:
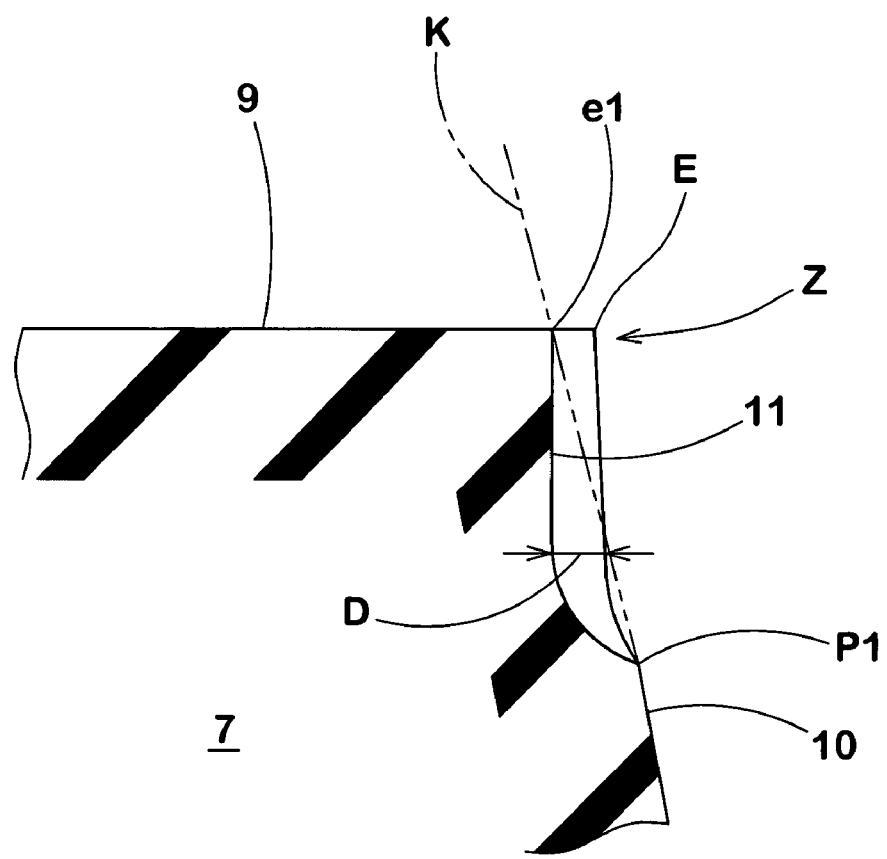
FIG. 5 is a cross sectional view taken on line B-B in FIG. 4.

In FIG. 5 is shown a cross sectional view taken on line B-B of FIG. 4 which is a cross sectional view perpendicular to an imaginary straight line Ve connecting the both ends E,E of a radially outer edge e1, which appears at the tread surface 9, of a recess portion 11. In the cross section shown in FIG. 5, it is preferable that the recess portion 11 is formed to smoothly recess toward the block center side with respect to an imaginary straight line K connecting the radially outer edge e1 and a radially inner end of the recess portion 11, namely an intersecting point P1 between the recess portion 11 and the wall surface 10, whereby the corner portions Z are effectively projected while a stress is prevented from concentrating on an inner side of the recess portion 11.

Figure 6A:
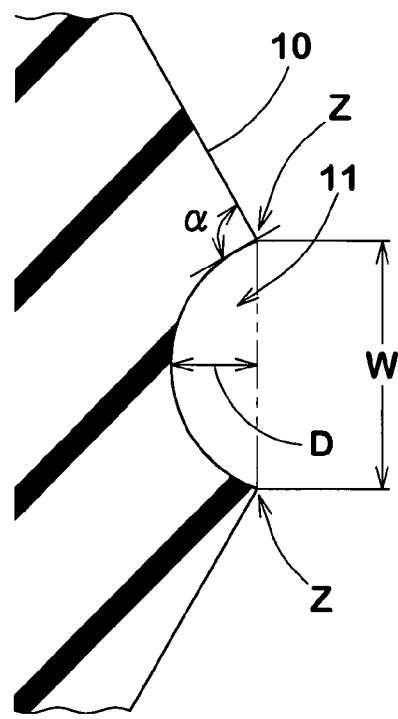
FIG. 6A is a partial sectional view of a recess portion in a block, which is parallel to the tread surface of the block.
Figure 6B:
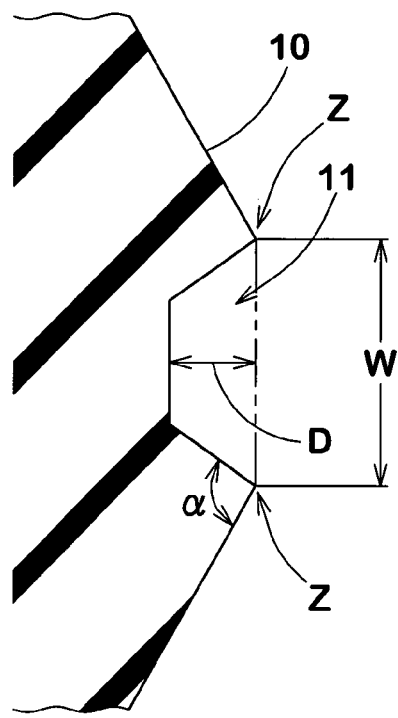
FIG. 6B is a partial sectional view showing another example of the recess portion.

In FIGS. 6A and 6B are shown partial cross sectional views of a block 7 cut by a plane parallel to the tread surface 9 of the block 7. The cross sectional shape of the recess portion 11 which appears at this cross section, is not particularly limited so long as it is concave toward the block center side, but preferred are an approximately arc-like shape as shown in FIG. 6A and an trapezoidal shape as shown in FIG. 6B. In particular, in case of a recess portion 11 having a sectional shape as shown in FIG. 6A, a stress is hard to concentrate on the recess portion 11 when the block 7 is deformed by ground contact or its release and, therefore, uneven abrasion or rubber chipping occurring from the recess portion 11 can be effectively prevented.

In particular, it is preferable to determine the transverse cross sectional shape of the recess portion 11 so that in the transverse cross section parallel to the tread surface 9, the interior angle α of the corner portions Z formed on the both sides of the recess portion 11 as shown in FIGS. 6A and 6B is less than 120°. If the interior angle α is not less than 120°, the corner portions Z tend to become hard to bite into the ground. On the other hand, if the interior angle α is too small, the rigidity of the corner portions Z is lowered, so uneven abrasion and rubber chipping are easy to occur. Therefore, the interior angle α of corner portion Z is preferably at least 70°, more preferably at least 80°.

In the cross section shown in FIGS. 6A and 6B, the width W of a recess portion 11, in other words, the length of a straight line connecting the both ends E,E of the recess portion 11, is not particularly limited. However, if the width W is too small, there is a possibility that the above-mentioned actions or effects of the recess portion 11 are lowered, and if the width W is too large, the block rigidity is excessively lowered and accordingly there is a possibility that the steering stability on a hard terrain is deteriorated. From such points of view, the width W of the recess portion 11 is preferably at least 1.0 mm, more preferably at least 1.5 mm, and is preferably at most 6.0 mm, more preferably at most 5.0 mm.

The recess portion 11 in the embodiment shown in the drawings extends radially inwardly from the tread surface 9 of a block 7 with keeping substantially a constant cross sectional shape, and terminates with smoothly decreasing its depth D as shown in FIG. 5. However, the shape of the recess portion 11 is not limited to such a shape, and the sectional shape of the recess portion 11 can be suitably changed during extending in the radial direction.

The depth D of recess portion 11 (the maximum depth of recess portion 11 from a straight line connecting the both ends E,E) is not particularly limited. However, if the depth D is too small, the corner portion Z is small, so there is a possibility that the above-mentioned actions or effects of the recess portion 11 are lowered. If the depth D is too large, the block rigidity is excessively lowered, so there is a possibility that the steering stability on a hard terrain is deteriorated. From such points of view, the depth D of the recess portion 11 is preferably at least 1.0 mm, more preferably at least 1.5 mm, and is preferably at most 4.0 mm, more preferably at most 3.0 mm.

As stated above, the pneumatic tire of the present invention is applicable to not only motorcycles, but also other vehicles such as tricycle buggy and four-wheeled vehicles.

<Cornering Performance and Straight Running Stability>

A test tire was attached to the rear wheel of a 450 cc motocross motorcycle under the following conditions and was run on a motocross test course comprising mainly a soft terrain. The cornering performance such as cornering speed, amount of slip and stability of vehicle and the straight running stability were evaluated by the feeling of ten test drivers. The evaluation was made by a five point method in which 3.0 point was imparted to the result of Comparative Example 1. The average value of the results obtained by ten test drivers is shown in Table 1. The larger the value, the better the performances.

Rim: 2.15 WM
Internal pressure: 90 kPa
Vehicle: Motorcycle for motocross with 450 cc displacement
Wheel attached with test tire: Rear wheel <Durability of Blocks>

After conducting a full throttle running for 20 minutes of the above motorcycle twice on the above test course, the state of abrasion of blocks and the presence of damages of blocks were visually observed and evaluated by a five point method in which 3.0 point was imparted to the result of Comparative Example 1. The larger the value, the better the durability.

The results are shown in Table 1.

It is observed in Table 1 that the tires of the Examples according to the present invention exhibit a high driving force on a rough terrain.

TABLE 1

|  | Com. Ex. 1 | Ex. 1 | Ex. 2 | Ex. 3 | Ex. 4 | Ex. 5 | Ex. 6 |
| --- | --- | --- | --- | --- | --- | --- | --- |
| Disposition of recess portions* | | | | | | | |
| Crown blocks | no | no | no | yes (all) | yes (all) | no | no |
| Shoulder blocks | no | yes (FIG. 2) | yes (all) | no | yes (FIG. 2) | yes (FIG. 2) | yes (FIG. 2) |
| L/BL ratio of length L of recess portion to height BL of block (%) | — | 50 | 50 | 50 | 50 | 20 | 50 |
| Width W of recess portion (mm) | — | 4.0 | 4.0 | 4.0 | 4.0 | 4.0 | 4.0 |
| Depth D of recess portion (mm) | — | 2.5 | 2.5 | 2.5 | 2.5 | 2.5 | 4.0 |
| Test results | | | | | | | |
| Cornering performance | 3.0 | 4.0 | 4.0 | 3.5 | 4.0 | 3.5 | 3.3 |
| Straight running stability | 3.0 | 3.0 | 2.9 | 2.8 | 2.8 | 3.0 | 3.0 |
| Durability of blocks | 3.0 | 3.0 | 3.0 | 3.0 | 3.0 | 3.0 | 2.8 |

(Note)
*"FIG. 2" denotes that recess portions are disposed at locations shown in FIG. 2, and "all" denotes that recess portions are disposed at all plane-intersecting portions of each block.

While a preferable embodiment of the present invention has been described with reference to the drawings, it goes without saying that the present invention is not limited to only such an embodiment and various changes and modifications may be made.

The present invention is more specifically described and explained by means of the following examples. It is to be understood that the present invention is not limited to these examples.

EXAMPLES

Off-road pneumatic tires for motorcycle (size: 120/80-19) having a block arrangement shown in FIG. 2 were manufactured based on the specifications shown in Table 1. The performances of the tires were evaluated by methods described below.

In Comparative Example 1, no recess portion was formed in both the shoulder and crown blocks.

What is claimed is:

1. A pneumatic tire for off-road traveling, comprising:
   a tread portion provided with a block pattern made up of a plurality of blocks
   each having a tread surface facing radially outward and a wall surface extending radially inwardly from the edge of said tread surface, and
   said plurality of blocks include recess blocks each provided with a recess portion which extends on the wall surface in the recess block in a tire radial direction, and whose radially outer end opens at the tread surface of the recess block and whose length in the tire radial direction along the wall surface is from 10 to 70% of the height of each block,
   wherein the recess portion is located at a corner formed by the intersection of two planes of the wall surface; the recess portion extends from one of said two planes to the other; in a plane parallel to the tread surface of the recess block, the recess portion has a substantially arc-shaped cross section and an interior angle of an intersection of the substantially arc-shaped recess portion and said wall surface is less than 120 degrees and at least 70 degrees; the recess portion has a width of at least 1.0 mm and at most 6.0 mm at the tread surface of the recess block; and the depth of the recess portion is at least 1.0 mm and at most 4.0 mm, and wherein said plurality of blocks are crown blocks the centroids of the tread surfaces of which are located in a crown region of the tread portion defined as centered on the tire equator and having an axial width of 40% of the width of said tread portion of the tire, and shoulder blocks the centroids of the tread surfaces of which are located in a pair of shoulder regions of the tread portion axially outward of said crown region, and the recess portions are provided in only said shoulder blocks.

2. The pneumatic tire of claim 1, wherein in a cross section perpendicular to an imaginary straight line connecting both ends of a radially outer edge, which appears at said tread surface, of said recess portion, said recess portion is recessed toward the block center side with respect to an imaginary straight line connecting said radially outer edge and a radially inner end of said recess portion.

3. The pneumatic tire of claim 1, wherein the interior angle is more than 90 degrees.

4. The pneumatic tire of claim 1, wherein
the wall surface of said recess block has a plurality of the intersecting portions at which two planes of the wall surface intersect each other, and
said plurality of intersecting portions include at least one inside intersection portion which is located on a tire equator side of the centroid of the tread surface of the recess block and whose interior angle between the two planes is more than 90 degrees, and at least one outside intersecting portion located on a tread edge side of the centroid of the tread surface of the recess block, wherein said at least one inside intersecting portion is provided with a recess portion, but said at least one outside intersecting portion is not provided with a recess portion.

* * * * *